United States Patent [19]
Luick et al.

[11] Patent Number: 5,872,990
[45] Date of Patent: Feb. 16, 1999

[54] REORDERING OF MEMORY REFERENCE OPERATIONS AND CONFLICT RESOLUTION VIA ROLLBACK IN A MULTIPROCESSING ENVIRONMENT

[75] Inventors: David Arnold Luick; John Christopher Willis; Philip Braun Winterfield, all of Rochester, Minn.

[73] Assignee: International Business Machines Corporation, Armonk, N.Y.

[21] Appl. No.: 779,071

[22] Filed: Jan. 7, 1997

[51] Int. Cl.[6] ........................................... G06F 9/38
[52] U.S. Cl. ..................... 395/800.24; 395/800.3; 395/800.23; 395/706; 395/709; 395/393; 395/569
[58] Field of Search ..................... 395/706, 709, 395/800.28–800.31, 800.29, 672, 676, 800.23, 800.24, 392, 569, 591, 800.3, 393, 394; 711/137, 130, 147, 153, 148

[56] References Cited

U.S. PATENT DOCUMENTS

| | | | |
|---|---|---|---|
| 4,413,317 | 11/1983 | Swenson | 364/200 |
| 4,600,986 | 7/1986 | Scheuneman et al. | 364/200 |
| 4,674,032 | 6/1987 | Michaelson | 364/200 |
| 4,999,554 | 3/1991 | Naka | 318/569 |
| 5,056,015 | 10/1991 | Baldwin et al. | 364/200 |
| 5,317,734 | 5/1994 | Gupta | 395/706 |
| 5,323,489 | 6/1994 | Bird | 395/425 |
| 5,333,280 | 7/1994 | Ishikawa et al. | 395/588 |
| 5,446,855 | 8/1995 | Dang | 395/401 |
| 5,675,759 | 10/1997 | Shebanow et al. | 395/393 |
| 5,799,179 | 8/1998 | Ebcioglu et al. | 395/581 |

FOREIGN PATENT DOCUMENTS

| | | |
|---|---|---|
| 4-52741 | 2/1992 | Japan . |
| 2 265 481 | 9/1993 | United Kingdom . |

OTHER PUBLICATIONS

Kemal Ebcioglu, "Some Design Ideas for a VLIW Architecture for Sequential–Natured Software", Proceedings of IFIP WG 10.3 Working Conference on Parallel Processing (M. Cosnard et al., ed.), North Holland (1988), pp. 1–22.

Golumbic et al. "Instruction Scheduling Beyond Basic Blocks" IBM J. Res. Develop., Jan. 1990.

Conn et al. "Architecture & Compiler Tradeoffs For a Long Instruction Word Microprocessor", 1989.

Ebcioglu et al. "Some Global Optimzation and Architectural Features for Leproor te Larmave of SuperScalar" IBM Research Report, Sep. 1990.

Nakatani et al. Using a Lookahead Window in a Compaction–Based Parallelizing Compiler IEEE, Nov. 1990.

Bernstein et al. "Proving Safety of Specalation Load Instruction at Compile Time", Feb. 1992.

Smith et al. "Boosting Beyond Static Scheduling in a Superscalar Processor" IEEE, Aug. 1990.

"Metaparallelism—Communication via Plaqholders" Ekanadham et al., Sep. 1993.

*Primary Examiner*—Larry D. Donaghue
*Attorney, Agent, or Firm*—Dan Hubert; Baker, Maxham, Jester & Meador

[57] ABSTRACT

Compile and/or run time instruction scheduling is used in a multiprocessing system to reorder memory access instructions such that a strongly consistent programming model is emulated in a fashion transparent to the programmer. The multiprocessing system detects potential shared memory conflicts, avoiding these conflicts by restarting operation of the affected processing unit at a predetermined previous state, previously archived in a rollback register set, and resuming instruction execution from that state.

64 Claims, 3 Drawing Sheets

REORDERING OF MEMORY REFERENCE OPERATIONS AND CONFLICT RESOLUTION VIA ROLLBACK IN A MULTIPROCESSING ENVIRONMENT

BACKGROUND OF THE INVENTION

1. Field of the Invention

The present invention relates to a digital data processing apparatus where multiple processing units concurrently access a shared memory. More particularly, the invention uses compile and/or run time scheduling to perform reordering of memory access instructions while emulating a strongly consistent programming model by detecting potential processing unit conflicts in shared memory and avoiding the conflicts by restarting operation of the affected processing unit at a previous state previously archived in a rollback register set.

2. Description of the Related Art

Modern unit processor designs often make extensive use of both compile time and run time instruction reordering. Very long instruction word ("VLIW") architecture provides an especially good example of aggressive instruction reordering for the sake of performance improvement.

A VLIW machine employs a compiler to search through a stream of machine instructions to identify instructions capable of being executed simultaneously. In accordance with this search, the instruction stream is reordered to assemble these instructions into a compound VLIW instruction. Each part of a VLIW instruction may control a separate part of hardware, such as an ALU, a path to main storage, or a path to a register. In one VLIW machine cycle, these separate resources can all be used; as a result, several basic machine instructions can execute concurrently. Thus, each task can be completed in fewer machine cycles than is possible on a traditional uniprocessor. VLIW fine-grained parallelism is said to exist at the machine instruction level within each task. VLIW therefore reduces the "turnaround time" from task initiation to task completion, so that results of the operation are available sooner.

One constant concern with multiprocessing systems is ensuring consistency of memory shared by the multiprocessors. With multiprocessing systems such as VLIW or superscalar designs, program instructions are represented by individual machine instructions such as "LOADs" and "STOREs" which are reordered and performed in parallel. The memory STORE operations, of course, change the contents of memory. However, the order in which these STORE operations are performed does not necessarily reflect the original program order. Thus, some conventions are necessary to determine when each multiprocessor recognizes ("observes") the results of the multiprocessors' STORE operations. Otherwise, a LOAD operation executing too early or too late may load the wrong data from memory.

These conventions are referred to as "consistency paradigms", and a number of different variations exist. "Strong ordering" is one of the most common paradigms for shared memory multiprocessing. Strong ordering dictates that all multiprocessors sharing the same memory will observe STORE operations executed by any specific processor in the order in which the LOADs and STOREs occur in the program source, i.e., in "program order". Therefore, strong ordering does not encumber the programmer, since the hardware strictly observes program order. The LOADs and STOREs executed by distinct processors, however, may be shifted in time to allow any apparent interleaving of memory references among processors through synchronization provided by higher level parallel constructs such as locks.

Some known systems implement the strong ordering paradigm by serializing references to shared memory. Namely, each STORE to shared memory is made visible to subsequent LOADs from any processor in the system before the processor continues on to the next STORE occurring in program order. Each LOAD from shared memory must observe the latest value of the shared memory before any subsequent LOADs in the same instruction stream.

This serialization of memory references reduces the rate at which instructions issue on each processor, thereby restricting multiprocessor performance. The performance degradation due to memory reference serialization adversely affects superscalar designs, and even more acutely affects VLIW designs.

To accelerate shared memory multiprocessing, several programming paradigms with less restrictive semantics are known. These include "firm consistency", "release consistency", and "weak consistency". Each of these less restrictive paradigms allows the programmer to permit visibility of LOADs and STOREs outside of program order. However, these weaker programming paradigms require the programmer to designate instruction boundaries ("barriers") beyond which compilers or hardware cannot migrate LOADs and/or STOREs. Thus, such less restrictive schemes impose additional work on the programmer to ensure correct program execution. Consequently, these approaches are not suitable for some applications, since (1) they require additional work that can be time-consuming for the programmer, and (2) they can be vulnerable to subtle, timing-sensitive correctness errors.

For the foregoing reasons, then, known multiprocessor consistency paradigms are not completely adequate for all applications.

SUMMARY OF THE INVENTION

Broadly, the invention uses both static (compile time) and dynamic (run time) instruction scheduling to reorder memory access instructions while emulating a strongly consistent programming model. This scheduling is performed transparently with respect to the programmer. The invention detects shared memory "conflicts", which occur when rescheduled LOAD operations are performed too early. The invention avoids these conflicts by restarting operation of the affected processing unit at a predetermined previous state, previously archived in a set of rollback registers.

One particular aspect of the invention concerns a digital data multiprocessing apparatus with multiple processing units including at least first and second processing units, which are associated with first and second instruction streams, respectively. Each instruction stream contains an ordered sequence of processing unit instructions for execution by the respective processing unit. Each processing unit is coupled to a machine register set having contents that define a state of the processing unit. Each processing unit is also coupled to a rollback register set. A shared cache, accessible by each of the multiple processing unit, has a plurality of storage locations, such as "cache lines".

Instructions in the respective instruction streams are reordered, maintaining consistency among the processing units. In the case of the first processing unit, for example, instructions of the first instruction stream are reordered to optimize execution of the first instruction stream by the first processing unit, where a LOAD) instruction is shifted to an earlier position in the first instruction stream. This LOAD instruction has the characteristic of directing the first processing unit to access a first one of the locations in the shared cache. This reordering may be performed at compile time (static reordering) or at run time (dynamic reordering). The first processing unit defines a "load percolation window", which includes all instructions between the LOAD instruction's earlier and later positions in the first instruction stream.

The first processing unit establishes checkpoints in the first instruction stream according to a predetermined schedule. The instructions between successive checkpoints constitute a "rollback window". The multiprocessing apparatus sequentially executes instructions of the first instruction stream while concurrently sequentially executing instructions of the second instruction stream. During execution of the first instruction stream, the first processing unit backs up contents of the first machine register set into the first rollback register set at each checkpoint.

If the second processing unit has performed any STORE operations to the first shared cache location during the load percolation window, execution of the first instruction stream is halted, and the first machine register set is restored to its state at the beginning of the rollback window. This restoration is achieved by copying into the machine register set. The first processing unit is then restarted to resume execution of the first instruction stream at the beginning of the rollback window.

Thus, as briefly discussed above, one specific aspect of the invention concerns a digital data multiprocessing apparatus, using compile and/or run time scheduling to perform transparent reordering of memory access instructions, while emulating a strongly consistent programming model by detecting potential conflicts in shared memory and avoiding the conflicts by employing a set of rollback registers to restart operation of the affected processing unit at a previous state, previously archived in the rollback register set. An additional, but different implementation of the invention concerns a process including a sequence of method steps for reordering memory access instructions and resolving conflicts via rollback in a multiprocessing environment.

The present invention provides its users with a number of distinct advantages. Chiefly, the invention facilitates especially flexible and efficient reordering of machine instructions, maintaining the appearance of a strongly ordered consistency paradigm to the programmer without the detriments of known strong consistency schemes. For instance, the invention avoids mandatory serializing of memory references, thereby encouraging speedy execution of instructions by the processing units. Furthermore, the consistency approach of the invention does not penalize the common situation where no conflicting accesses to shared memory occur during the load percolation window.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

HARDWARE ENVIRONMENT

Figure 1:
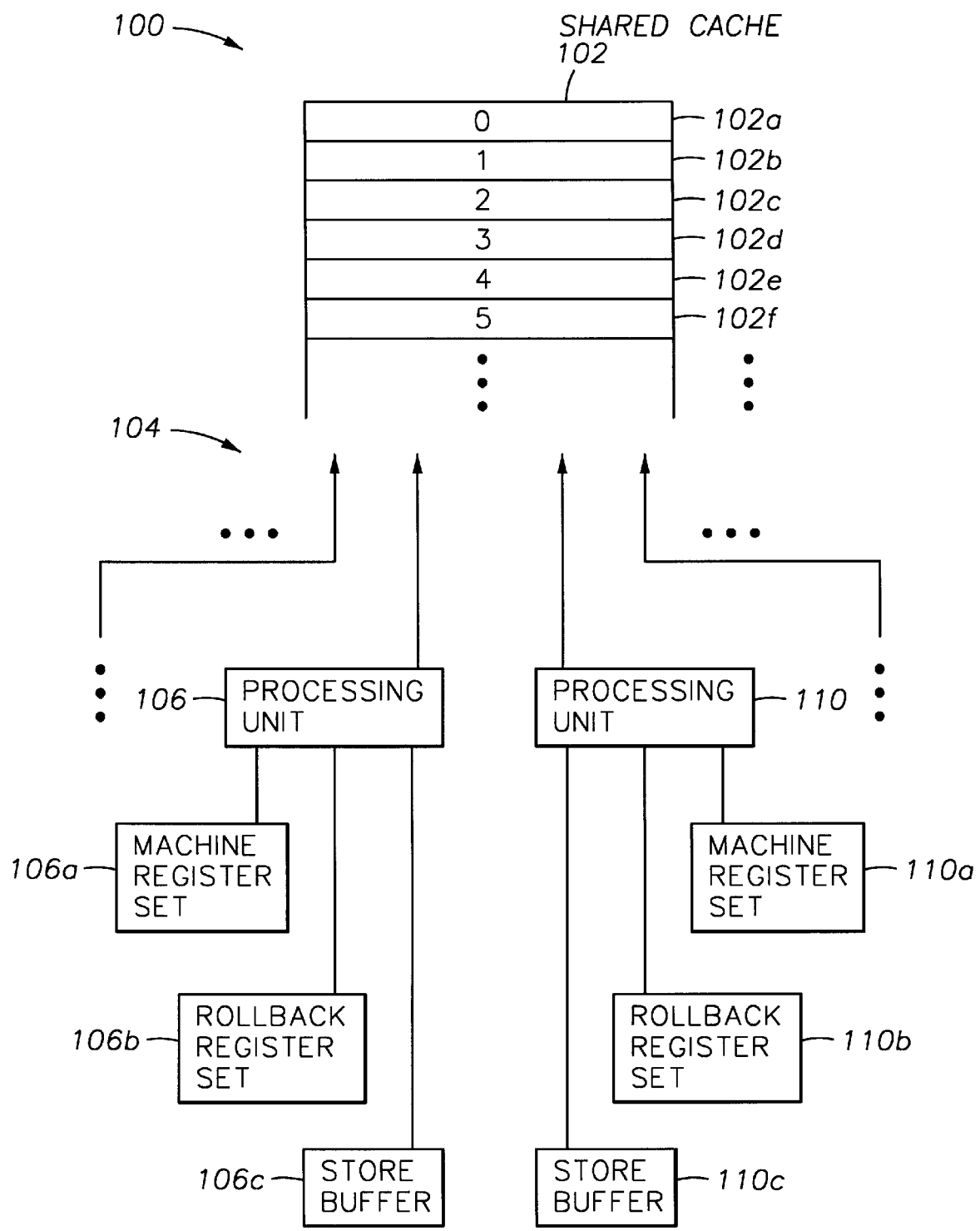
FIG. 1 is a block diagram of the hardware components and interconnections of a multiprocessing apparatus according to one embodiment of the present invention.

One aspect of the invention concerns a digital data multiprocessing apparatus 100, which may be embodied by various hardware components and interconnections as described in FIG. 1 As an example, the multiprocessing apparatus 100 may be embodied in a computing system such as an IBM AS/400 system, or another suitable system with a cache 102 shared by multiple processing units 104. Each processing unit 104 preferably comprises a microprocessor or a microprocessor accompanied by various supporting circuitry. As an example, each processing unit 104 may comprise a 64-bit Power-PC microprocessor chip. The processing units 104 include at least a first processing unit 106 and a second processing unit 110. Each of the processing units 106/110 is coupled to respective machine register sets 106a/110a, rollback register sets 106b/110b. And store buffers 106c/110c. Each machine register set 106a/110a includes a number of machine registers that collectively define the "state" of the corresponding processing unit 106/110. The rollback register sets 106b/110b comprise a number of memory registers suitable for storing duplicate copies of the corresponding machine register set at designated "checkpoints" in time. The store buffers 106c/110c comprise memory buffers for temporarily storing results of STORE operations performed by the corresponding processing units 106/110.

In an exemplary embodiment, the shared cache 102 may comprise an appropriately sized module of dynamic random access memory, external to the processing units 104. The cache 102 includes a number of separate addresses 102a–102f referred to as "cache lines"

Figure 2:
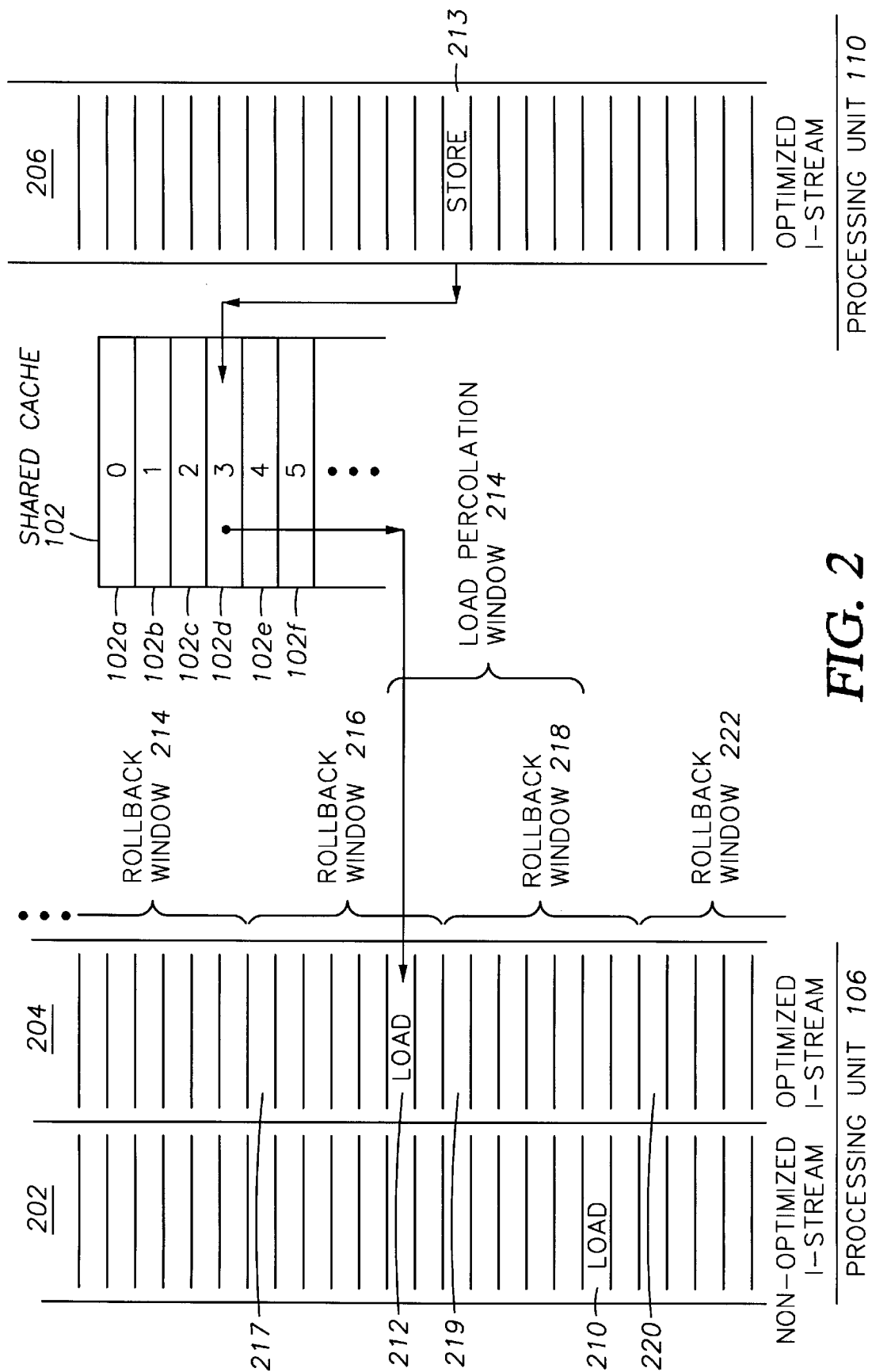
FIG. 2 is a block diagram illustrating the reordering of machine instruction streams and concurrent access to shared cache by multiple processing units according to the present invention.

The processing units 106/110 access the shared cache 102 in accordance with instructions provided in respective instruction streams. FIG. 2 illustrates the relationship between the shared cache 102 and operations scheduled in the respective instruction streams of the processing units 106/110. The processing unit 106 operates according to the instruction stream 202, whereas the processing unit 110 operates according to the instruction stream 206. Each instruction stream contains a sequence of processing unit commands, such as LOAD and STORE commands.

Operation of the data multiprocessing apparatus 100, including management of the instruction streams 202/206, is discussed in greater detail below.

Operation

Figure 3:
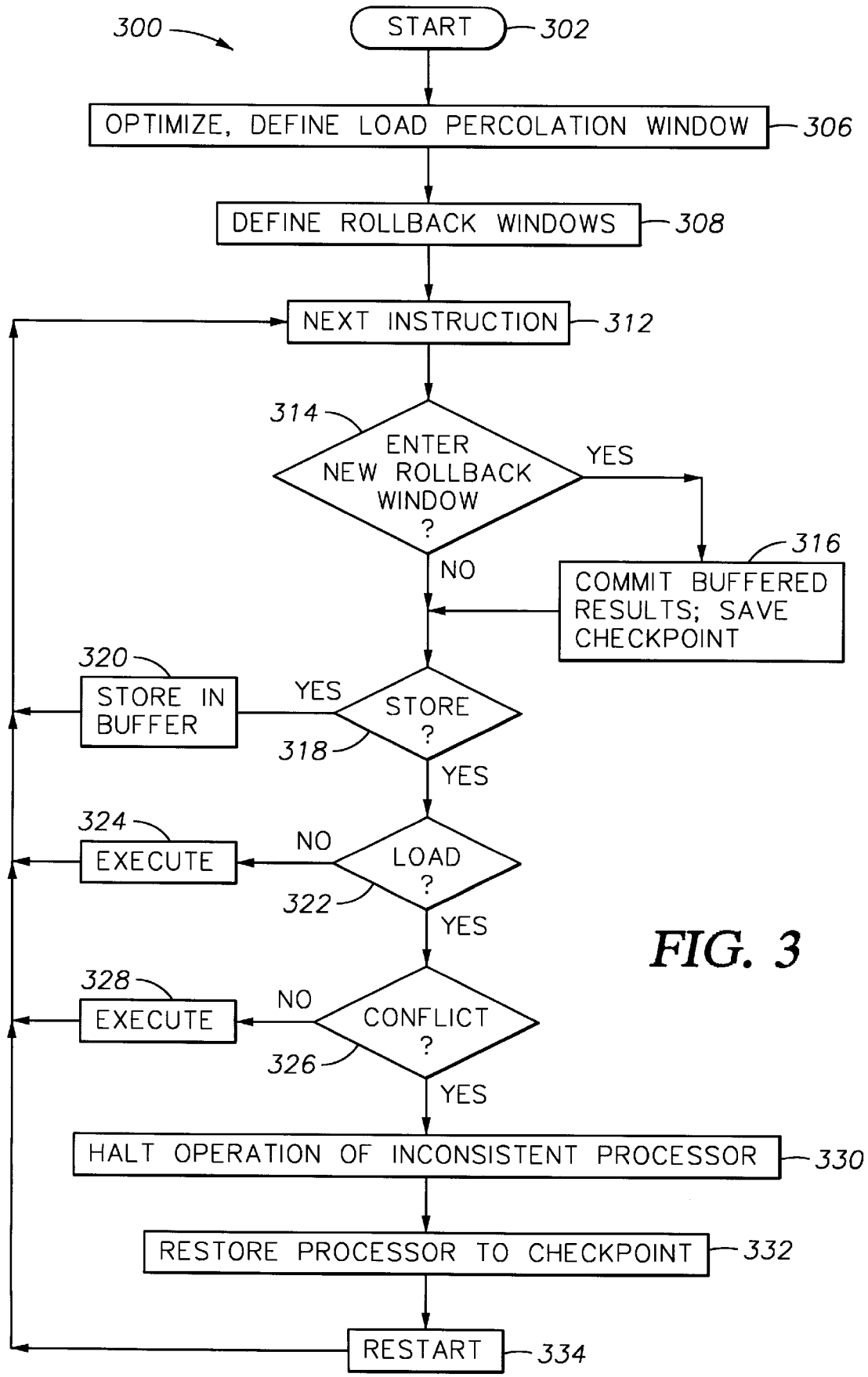
FIG. 3 is a flowchart illustrating a process for operating a multiprocessing apparatus in accordance with the invention.

In addition to the various hardware embodiments described above, a different aspect of the invention concerns a process for reordering of instruction streams and conflict resolution via rollback in a digital data multiprocessing system. This process may be implemented, for example, by operating the multiprocessing apparatus 100 according to a sequence of operational steps. FIG. 3 shows a sequence of steps 300 to illustrate one example of the process aspect of the present invention. For ease of explanation, but without any limitation intended thereby, the example of FIG. 3 is described in the context of the hardware environment of FIGS. 1–2, as described above.

For ease of explanation, the sequence 300 is described in the context of the instruction stream of the first processing unit 106. It is understood, however, that these same steps 300 are independently performed for each processing unit's instruction stream to optimize the machine instructions therein and eliminate conflicts with other processing units. As explained in greater detail below, a shared memory "conflict" occurs when a LOAD operation is scheduled too early in the instruction stream, permitting another processing unit to STORE data in the same location of the shared memory; as a result, the LOAD operation loads a value prematurely possibly loading a different value than would have been loaded by the original (i.e., non-reordered) LOAD instruction.

Optimization

After the steps 300 are initiated in task 302, the instructions stream 202 is optimized in task 306. Preferably, this optimization is performed by a compiler (not shown), which optimizes the instructions 202 before providing them to the processing unit 106 for execution. This optimization, performed in advance of program execution, may be referred to as compile time (or "static") instruction reordering. As an alternative, the compiler may perform run time ("dynamic") reordering of instructions, where some instructions are optimized while others are being executed.

The compiler (not shown) may comprise any compiler, known or otherwise, suitable to employ code optimization techniques to move each machine instruction as early in the instruction stream as possible. One example is "percolation scheduling", discussed in greater detail in Kemal Ebcioglu, "Some Design Ideas for a VLIW Architecture for Sequential-Natured Software", *Proceedings of IFIP WG* 10.3 *Working Conference on Parallel Processing* (M. Cosnard et al., ed.), North Holland (1988). The foregoing publication is incorporated by reference.

The optimized instruction stream is shown by reference numeral 204. The instruction streams 202/204 represent a side-by-side before/after comparison.

Load Percolation Windows

Optimization of the instruction stream 202 (task 306) preferably moves each instruction as early as possible in the instruction stream 202, subject to an upper limit defined by a rollback window (discussed below). In other words, an instruction may not be shifted more than the distance of one rollback window. For each reordering of a LOAD command, task 306 defines a corresponding "load percolation window". Each load percolation window spans the interstitial instructions between the new (after optimization) and old (before optimization) positions of a LOAD instruction. It is during these intermediate instructions that an inconsistency in the instruction stream 204 may arise if another processing unit performs a STORE operation to the same cache location accessed by the LOAD operation.

The new (post-optimization) instruction position may be referred to as the instruction's "earlier" position, as it is earlier in the instruction stream's order of execution. Likewise, the old (pre-optimization) instruction position may be referred to as the instruction's "later" position, as it is later in the instruction stream's order of execution. In the illustrated example, optimization of the instruction stream 202 shifts a LOAD command from a later position 210 to an earlier position 212. The LOAD command in this example retrieves the contents of the cache line 102*d*. The area between the positions 210 and 212 constitutes the load percolation window 214. Namely, the upshifting of the LOAD command 210 makes this command vulnerable to another processing unit's performance storing data in the same cache line 102*d* during the load percolation window 214; if this should occur, the LOAD command 212 would obtain data different than the programmer originally intended for retrieval by the LOAD command 210.

Rollback

After task 306, task 308 defines a number of rollback windows in the optimized stream 204. Preferably, definition of the rollback windows, like the optimization of task 306, is also performed by the compiler (not shown) at compile time. Each rollback window contains a predetermined number of instructions. And the beginning of each rollback window constitutes a "checkpoint" at which the state of the corresponding processing unit is archived, as discussed below. As discussed below, the "state" of the processing unit 106 is effectively saved at each checkpoint using the rollback register set 106*b*. This facilitates possible resetting of the processing unit 106 to a previous state to avoid shared memory conflicts. However, since the illustrated example limits load percolations to the number of instructions in the rollback window, only two checkpoints need to be saved. The earliest possible rollback would go to the start of the previous rollback window, a maximum of two check points earlier than the current instruction.

The length of the rollback window depends upon a number of different factors. One factor is the availability of hardware resources, as buffer space is required to contain all STORE instructions occurring during a rollback window, as discussed below. Another factor is that longer rollback windows subject the processing units a greater possibility of conflict, in particular, since percolation of a LOAD is limited to the length of the rollback window, longer rollback windows mean longer LOAD percolation and more susceptibility to the occurrence of conflicting STORE, operations. Another factor to be considered is that longer rollback windows require more time for a processing unit to recover from a conflict, since more machine instructions must be repeated (sec task 332, discussed below).

For ease of understanding, the rollback window in the illustrated example is seven instructions long. However in implementation, a rollback window of at least 10–20 instructions is preferable. In the illustrated example, then, task 308 defines rollback windows in the instruction stream 204 spanning adjacent groups of seven instructions. These rollback windows include windows 214, 216, 218 and 222. The instructions starting each rollback window (e.g. . . . 217, 219, 220 . . . ) constitute checkpoints, discussed below.

Instruction Execution

After the compile time optimization in definition of tasks 306–308, the processing unit 106 in task 312 examines the next instruction in the optimized instruction stream 204. This may be the first instruction (if the routine 300 has just begun) or some instruction more deeply embedded in the instruction stream 202 (if a number of preceding instructions have been processed in tasks 314–334). If query 314 finds that the current instruction does not begin a new rollback window, query 318 asks whether the current instruction is a STORE operation. If so, the STORE operation is executed by queuing its results in the STORE buffer 106*c*. The STORE results must be temporarily buffered to avoid affecting the shared cache 102 in the event rollback later becomes necessary. As discussed below, STORE results are buffered for two successive rollback windows to facilitate rollback in accordance with the invention. If queries 318/322 find that the current instruction is neither a STORE nor a LOAD, the processing unit 106 simply executes the current instruction in task 324. After tasks 320 and 324, control returns to task 312 to review the next instruction in the stream 204.

Whenever query 314 finds that the current instruction begins a new rollback window, then the processing unit 106 takes certain action in task 316. Mainly, the processing unit 106 (1) commits certain results from the STORE buffer 106c, and (2) archives the current machine state as a checkpoint. More particularly, the processing unit 106 in task 316 commits the STORE results from the rollback window occurring two rollback windows ago; these results are committed by storing them in the shared cache 102. These results can be committed without any risk that rollback may eventually be performed into the range of instructions corresponding to the buffered results. This is because, as discussed above, LOAD percolation cannot exceed the number of instructions in one rollback window, e.g., seven instructions in the present example. Thus, the STORE buffer 106c contains results from STORE operations of the current rollback window, and two preceding rollback windows at any time. Archival of the processing unit's current machine state in task 316 involves archiving contents of the machine register 106a into the rollback register 106b. Thereby establishing a checkpoint at this specific point in the instruction stream 204.

Detecting and Resolving Conflicts

If queries 318 and 322 determine that the current instruction is a LOAD operation, query 326 asks whether there is a shared cache conflict. Namely, query 326 determines whether a shared cache 102 conflict has arisen due to another processing unit's storing data in the cache line 102d during the first processing unit's load percolation window 214.

If no conflict exists, task 328 executes the LOAD operation, and then returns to task 312, described above. If query 326 finds a conflict, operation of the first processing unit 104 is halted in task 330. Other processing units, including the processing unit performing the conflicting STORE operation, continue to make forward progress. In the illustrated example after performance of the instruction 219 (concurrent with the STORE 213) the processing unit 106 determines that a conflict exists because the LOAD operation 212 was rescheduled before another processing unit's STORE operation 213 to the same cache location 102d. A conflict exists because the LOAD 212 will obtain a different value from the cache line 102d than the original LOAD 210, which would have occurred after the STORE 213. Thus, operation of the first processing unit 106 must be halted, as shown in task 330.

After task 330, the first processing unit 106 is restored (task 332) to the machine state defined by the checkpoint preceding the optimized location 212 of the frustrated LOAD command. In the illustrated example, the processing unit 106 is restored to the machine state corresponding to instruction position 217, the beginning of the rollback window 216 containing the earliest LOAD 212. This is achieved by copying the appropriate contents (representing the checkpoint 217) of the rollback register set 106b to the machine register set 106a, thereby restoring the processing unit 106 to the desired previous state.

Having restored the processing unit 106 to the previous state, task 334 resumes operation of the processing unit 106 at the machine instruction corresponding to the restored state. In the illustrated example, this involves restarting the first processor's process of instruction execution at the instruction 217. From that point, the processing unit 106 continues to reexecute old instructions, ultimately reaching and then passing the point of previous conflict in the instruction stream. The previously executed instructions may be obtained from any source, in the apparatus 100 or elsewhere, containing old instructions from the stream 206. A number of such sources will be apparent to those of ordinary skill in the art having the aid of this disclosure. After task 334, the routine 400 returns to task 312.

Advantages

The foregoing approach has a number of distinct advantages. Chiefly, this process facilitates especially flexible and efficient reordering of machine instructions, transparent to program execution. The optimization is flexible and efficient because it does not impose additional work on the programmer, for example, to designate instruction migration boundaries to ensure correct program execution. Thus, instruction reordering according to the invention maintains the appearance of a strongly ordered consistency paradigm (to the programmer), without the detriments of known strong consistency schemes. For instance, the invention avoids mandatory serializing of memory references, and therefore encourages speedy execution of instructions by the processing units.

Another distinct advantage of the present invention is that it does not penalize the situation where no conflicting shared memory accesses occur during the load percolation window. The present inventors have discovered that memory contention is actually rare, and multiprocessors implementing references out of program order seldom actually make conflicting references to the same shared memory block during the few cycles when a load is rescheduled earlier than program order. Less restrictive consistency models penalize this situation, by imposing additional work on the programmer that is time consuming and susceptible to timing sensitive correctness errors. Thus, the invention is beneficial because it does not penalize the situation where no conflicting shared memory accesses occur during the load percolation window.

With the present invention, the processing units continue to execute their instruction streams normally when no conflicting accesses to shared memory occur during the load percolation window. Therefore, during most times, the processing units operate with peak efficiency. In the rare instance when a processing unit does experience a conflict, the processing unit is restored to a previous machine state and directed to reexecute a number of past machine instructions. This process slightly delays the processing unit's operation, but this delay is relatively insignificant considering the frequency with which it is necessary.

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A method of expediting memory reference operations in a multiprocessing apparatus that includes (1) multiple processors including first and second processors associated with respective first and second processor instruction streams each stream containing an ordered sequence of processor instructions for execution by the respective processor, (2) first and second machine register sets coupled to the first and second processors, respectively, each machine register set having contents that define a state of the respective processor, (3) first and second rollback register sets coupled to the first and second processors, respectively, and (4) a shared cache accessible by each of the multiple processors and having a plurality of storage locations, the method comprising the steps of:

reordering instructions of the first instruction stream to optimize execution of the first instruction stream by the first processor, the reordering including shifting of a LOAD instruction from a later position to an earlier position in the first instruction stream, the LOAD instruction directing the first processor to access a first one of the locations in the shared cache;

establishing checkpoints in the first instruction stream according to a predetermined schedule, intervening instructions between successive checkpoints defining rollback windows;

defining a load percolation window including all instructions between the LOAD instruction's earlier and later positions in the first instruction stream;

sequentially executing instructions of the first instruction stream while concurrently sequentially executing instructions of the second instruction stream;

during execution of the first instruction stream, at each checkpoint backing-up contents of the first machine register set into the first rollback register set; and determining whether the second processor performed any STORE operations to the first location during the load percolation window, and if so, operating the first processor to perform steps comprising:

halting execution of the first instruction stream;

restoring the first machine register set to its state at the beginning of the rollback window containing the earlier LOAD by copying corresponding contents of the first rollback register set;

re-executing instructions of the first instruction stream in the rollback window containing the earlier LOAD; and resuming execution of the first instruction stream starting at a next instruction immediately after the rollback window containing the earlier LOAD.

2. The method of claim 1, further comprising the steps of:

reordering instructions of the second instruction stream to optimize execution of the second instruction stream by the second processor, the reordering including shifting of a second LOAD instruction from a later position to an earlier position in the second instruction stream, the second LOAD instruction directing the second processor to access a second one of the locations in the shared cache;

establishing second checkpoints according to a predetermined schedule, intervening instructions between successive checkpoints defining rollback windows;

defining a second load percolation window including all instructions between the second LOAD instruction's earlier and later positions in the second instruction stream;

sequentially executing instructions of the second instruction stream while concurrently sequentially executing instructions of the second instruction stream;

during execution of the second instruction stream, at each second checkpoint backing-up content of the second machine register set into the second rollback register set; and determining whether the first processor performed any STORE operations to the second location in the shared cache during the second load percolation window, and if so, operating the second processor to perform steps comprising:

halting execution of the second instruction stream;

restoring the second machine register set to its state at the beginning of the rollback window containing the earlier second LOAD by copying corresponding contents of the second rollback register set;

re-executing instructions of the second instruction stream in the rollback window containing the earlier second LOAD; and resuming execution of the second instruction stream starting at a next instruction immediately after the rollback window containing the earlier second LOAD.

3. The method of claim 1, where STORE operations of the first processor are initially made to a temporary STORE buffer and subsequently committed to the shared cache upon satisfaction of a predetermined criteria.

4. The method of claim 3, the predetermined criteria comprising a condition that, for any LOAD operations in the first instruction stream dependent upon results of the buffered STORE operations, said LOAD operations are free from conflict with the second processor.

5. The method of claim 3, the predetermined criteria comprising progression of instruction execution by the first processor past two checkpoints after the STORE instruction.

6. The method of claim 1, the predetermined schedule specifying checkpoints occurring at a constant interval in the instruction stream, said constant interval being a predetermined rollback window length.

7. The method of claim 1, the backing-up step only maintaining copies of machine register set contents corresponding to two preceding checkpoints immediately prior to the current instruction in the first instruction stream.

8. The method of claim 1, the reordering step being performed by a compiler in advance of the establishing, defining, sequentially executing, backing-up, and determining steps.

9. The method of claim 1, the reordering step being performed concurrently with at least one of the establishing, defining, sequentially executing, backing-up, and determining steps.

10. The method of claim 1, the reordering step being performed by load percolation scheduling.

11. The method of claim 1, all rollback windows having a common, fixed length, the reordering step limiting each LOAD percolation window to a maximum length equal to the fixed length of rollback window.

12. The method of claim 1, each location in the shared cache being a cache line.

13. The method of claim 1, the shared cache comprising random access memory.

14. The method of claim 1, wherein executed instructions of the first instruction stream having a predetermined recency are archived by the multiprocessing apparatus, the re-executing step comprising the steps of obtaining archived instructions of the rollback window in the first instruction stream and re-executing the obtained instructions.

15. The method of claim 1, the first processor comprising a microprocessor.

16. A method for rollback conflict recovery emulating strong consistency in a shared cache multiprocessing system having multiple processors each with an associated instruction stream, said method comprising the following steps performed for each processor and its associated instruction stream:

reordering instructions of the instruction stream to optimize the processor's execution of the associated instruction stream, the reordering including shifting of a LOAD instruction to an earlier position in the instruction stream, the LOAD instruction directing the processor to access a first one of the locations in the shared cache;

defining a load percolation window including all instructions between the earlier and later positions of the LOAD instruction in the instruction stream;

selecting an unexecuted instruction next in sequence in the instruction stream, and performing steps comprising:
- if the selected instruction is a STORE command to store a value in the shared cache, storing the value in a temporary queue;
- if the selected instruction is a LOAD command to obtain contents of a first location in the shared cache, determining whether a conflict exists by determining whether another processor has performed any STORE operations to the first location during the load percolation window, and if no conflict exists executing the LOAD command, otherwise resolving the conflict by performing steps comprising:
  - halting the processor's execution of instructions in the instruction stream;
  - restoring the processor to a previous state, experienced by the processor upon execution of a previously executed instruction in the instruction stream; and
  - re-starting the processor's execution of the instruction stream at a point immediately following the previously executed instruction and then continuing by sequentially executing subsequent instructions of the instruction stream.

17. The method of claim 16, each processor having an associated machine register set and rollback register set, the method further comprising the steps of:
    - establishing checkpoints in the first instruction stream according to a predetermined schedule, intervening instructions between successive checkpoints defining rollback windows; and
    - during execution of each instruction corresponding to a checkpoint in the instruction stream, backing-up content of the processor's machine register set into the processor's rollback register set.

18. The method of claim 16, the restoring step comprising restoring contents of the processor's machine register set to its state at the beginning of the rollback widow containing the earlier LOAD by copying corresponding contents of the first rollback register set.

19. The method of claim 16, the re-starting step comprising the steps of re-executing instructions of the rollback window containing the earlier LOAD and then resuming execution of the instruction stream starting at a next instruction immediately after the rollback window containing the earlier LOAD.

20. The method of claim 16, where STORE operations of the first processor are initially made to a temporary STORE buffer and subsequently committed to the shared cache upon satisfaction of a predetermined criteria.

21. The method of claim 20, the predetermined criteria comprising a condition that, for any LOAD operations in the first instruction stream dependent upon results of the buffered STORE operations, said LOAD operations are free from conflict with the second processor.

22. The method of claim 20, the predetermined criteria comprising progression of instruction execution by the first processor past two checkpoints after the STORE instruction.

23. The method of claim 16, the predetermined schedule specifying checkpoints occurring at a constant interval in the instruction stream, said constant interval being a predetermined rollback window length.

24. The method of claim 16, the backing-up step only maintaining copies of machine register set contents corresponding to two preceding checkpoints immediately prior to the current instruction in the first instruction stream.

25. The method of claim 16, the reordering step being performed by a compiler in advance of the establishing, defining, sequentially executing, backing-up, and determining steps.

26. The method of claim 16, the reordering step being performed concurrently with at least one of the establishing, defining, sequentially executing, backing-up, and determining steps.

27. The method of claim 16, the reordering step being performed by load percolation scheduling.

28. The method of claim 17, all rollback windows having a common, fixed length, the reordering step limiting each LOAD percolation window to a maximum length equal to the fixed length of rollback window.

29. The method of claim 16, each location in the shared cache being a cache line.

30. The method of claim 16, the shared cache comprising random access memory.

31. The method of claim 17, wherein executed instructions of the first instruction stream having a predetermined recency are archived by the multiprocessing apparatus, the re-executing step comprising the steps of obtaining archived instructions of the rollback window in the first instruction stream and re-executing the obtained instructions.

32. The method of claim 16, each processor comprising a microprocessor.

33. A digital data multiprocessing apparatus, comprising:
- multiple processors including first and second processors associated with first and second processor instruction streams, respectively, each stream containing an ordered sequence of processor instructions for execution by the respective processor;
- a first machine register set coupled to the first processor and having contents that define a state of the first processor;
- a first rollback register set coupled to the first processor; and
- a shared cache accessible by each of the multiple processors and having a plurality of storage locations;
- the first processor being programmed to perform steps comprising:
  - receiving a reordered version of the first instruction stream, said reordering having been performed by a compiler to optimize execution of the first instruction stream by the first processor, the reordering having shifted of a LOAD instruction to an earlier position in the first instruction stream, the LOAD instruction directing the first processor to access a first one of the locations in the shared cache;
  - establishing checkpoints in the first instruction stream according to a predetermined schedule, intervening instructions between successive checkpoints defining rollback windows;
  - defining a load percolation window including all instructions between the LOAD instruction's earlier and later positions in the first instruction stream;
  - sequentially executing instructions of the first instruction stream while concurrently sequentially executing instructions of the second instruction stream;
  - during execution of the first instruction stream, at each checkpoint backing-up contents of the first machine register set into the first rollback register set; and
  - determining whether the second processor performed any STORE operations to the first location during the load percolation window, and if so, operating the first processor to perform steps comprising:
    - halting execution of the first instruction stream;
    - restoring the first machine register set to its state at the beginning of the rollback window containing the earlier LOAD by copying corresponding contents of the first rollback register set;

re-executing instructions of the first instruction stream in the rollback window containing the earlier LOAD; and resuming execution of the first instruction stream starting at a next instruction immediately after the rollback window containing the earlier LOAD.

34. The apparatus of claim 33, further comprising:

a second machine register set coupled to the second processor and having contents that define a state of the second processor; and a second rollback register set coupled to the second processor;

the second processor being programmed to perform method steps comprising:

receiving a reordered version of the second instruction stream, said reordering having been performed by a compiler to optimize execution of the second instruction stream by the second processor, the reordering including shifting of a LOAD instruction from a later position to an earlier position in the second instruction stream, the LOAD instruction directing the second processor to access a second one of the locations in the shared cache;

establishing second checkpoints according to a predetermined schedule, backing-up content of the second machine register set into the second rollback register set, intervening instructions between successive checkpoints defining rollback windows;

defining a second load percolation window including all instructions between the second LOAD instruction's earlier and later positions in the second instruction stream;

sequentially executing instructions of the second instruction stream while concurrently sequentially executing instructions of the second instruction stream;

during execution of the second instruction stream, at each second checkpoint backing-up content of the second machine register set into the second rollback register set; and determining whether the first processor performed any STORE operations to the second location in the shared cache during the second load percolation window, and if so, operating the second processor to perform steps comprising:

halting execution of the second instruction stream;

restoring the second machine register set to its state at the beginning of the rollback window containing the earlier second LOAD by copying corresponding contents of the second rollback register set;

re-executing instructions of the second instruction stream in the rollback window containing the earlier second LOAD; and resuming execution of the second instruction stream starting at a next instruction immediately after the rollback window containing the earlier second LOAD.

35. The apparatus of claim 33, where STORE operations of the first processor are initially made to a temporary STORE buffer and subsequently committed to the shared cache upon satisfaction of a predetermined criteria.

36. The apparatus of claim 35, the predetermined criteria comprising a condition that, for any LOAD operations in the first instruction stream dependent upon results of the buffered STORE operations, said LOAD operations are free from conflict with the second processor.

37. The apparatus of claim 35, the predetermined criteria comprising progression of instruction execution by the first processor past two checkpoints after the STORE instruction.

38. The apparatus of claim 33, the predetermined schedule specifying checkpoints occurring at a constant interval in the instruction stream, said constant interval being a predetermined rollback window length.

39. The apparatus of claim 33, the backing-up step only maintaining copies of machine register set contents corresponding to two preceding checkpoints immediately prior to the current instruction in the first instruction stream.

40. The apparatus of claim 33, further comprising a compiler to perform the reordering step in advance of the establishing, defining, sequentially executing, backing-up, and determining steps.

41. The apparatus of claim 40, the compiler implementing load percolation scheduling.

42. The apparatus of claim 33, the reordering step being performed concurrently with at least one of the establishing, defining, sequentially executing, backing-up, and determining steps.

43. The apparatus of claim 33, all rollback windows having a common, fixed length, the reordering step limiting each LOAD percolation window to a maximum length equal to the fixed length of rollback window.

44. The apparatus of claim 33, each location in the shared cache being a cache line.

45. The apparatus of claim 33, the shared cache comprising random access memory.

46. The apparatus of claim 33, wherein executed instructions of the first instruction stream having a predetermined recency are archived by the multiprocessing apparatus, the re-executing step comprising the steps of obtaining archived instructions of the rollback window in the first instruction stream and re-executing the obtained instructions.

47. The apparatus of claim 32, the first processor comprising a microprocessor.

48. A shared cache multiprocessing system emulating strong consistency, said multiprocessing system having multiple processors each with an associated instruction stream, each said processor being programmed to perform the following steps:

reordering instructions of the instruction stream to optimize the processor's execution of the associated instruction stream, the reordering including shifting of a LOAD instruction to an earlier position in the instruction stream, the LOAD instruction directing the processor to access a first one of the locations in the shared cache;

defining a load percolation window including all instructions between the earlier and later positions of the LOAD instruction in the instruction stream;

selecting an unexecuted instruction next in sequence in the instruction stream, and performing steps comprising:

if the selected instruction is a STORE command to store a value in the shared cache, storing the value in a temporary queue;

if the selected instruction is a LOAD command to obtain contents of a first location in the shared cache, determining whether a conflict exists by determining whether another processor has performed any STORE operations to the first location during the load percolation window, and if no conflict exists executing the LOAD command, otherwise resolving the conflict by performing steps comprising:

halting the processor's execution of instructions in the instruction stream;

restoring the processor to a previous state experienced by the processor upon execution of a previously executed instruction in the instruction stream; and re-starting the processor's execution of the instruction stream at a point immediately following the previously executed instruction and then continuing by sequentially executing subsequent instructions of the instruction stream.

49. The system of claim 48, each processor having an associated machine register set and rollback register set, the method further comprising the steps of:

establishing checkpoints in the first instruction stream according to a predetermined schedule, backing-up content of the processor's machine register set into the processor's rollback register set, intervening instructions between successive checkpoints defining rollback windows; and during execution of each instruction corresponding to a checkpoint in the instruction stream, backing-up content of the processor's machine register set into the processor's rollback register set.

50. The system of claim 48, the restoring step comprising restoring contents of the processor's machine register set to its state at the beginning of the rollback widow containing the earlier LOAD by copying corresponding contents of the first rollback register set.

51. The system of claim 48, the re-starting step comprising the steps of re-executing instructions of the rollback window containing the earlier LOAD and then resuming execution of the instruction stream starting at a next instruction immediately after the rollback window containing the earlier LOAD.

52. The system of claim 48, where STORE operations of the first processor are initially made to a temporary STORE buffer and subsequently committed to the shared cache upon satisfaction of a predetermined criteria.

53. The system of claim 52, the predetermined criteria comprising a condition that, for any LOAD operations in the first instruction stream dependent upon results of the buffered STORE operations, said LOAD operations are free from conflict with the second processor.

54. The system of claim 52, the predetermined criteria comprising progression of instruction execution by the first processor past two checkpoints after the STORE instruction.

55. The system of claim 48, the predetermined schedule specifying checkpoints occurring at a constant interval in the instruction stream, said constant interval being a predetermined rollback window length.

56. The system of claim 48, the backing-up step only maintaining copies of machine register set contents corresponding to two preceding checkpoints immediately prior to the current instruction in the first instruction stream.

57. The system of claim 48, the reordering step being performed by a compiler in advance of the establishing, defining, sequentially executing, backing-up, and determining steps.

58. The system of claim 57, the compiler implementing load percolation scheduling.

59. The system of claim 48, the reordering step being performed concurrently with at least one of the backing-up, defining, sequentially executing, and determining steps.

60. The system of claim 49, all rollback windows having a common, fixed length, the reordering step limiting each LOAD percolation window to a maximum length equal to the fixed length of rollback window.

61. The system of claim 48, each location in the shared cache being a cache line.

62. The system of claim 48, the shared cache comprising random access memory.

63. The system of claim 49, wherein executed instructions of the first instruction stream of a predetermined recency are stored by the multiprocessing apparatus, the re-executing step comprising the steps of obtaining instructions of the first instruction stream from the first rollback window and re-executing the obtained instructions.

64. The system of claim 48, each processor comprising a microprocessor.

* * * * *

UNITED STATES PATENT AND TRADEMARK OFFICE
CERTIFICATE OF CORRECTION

PATENT NO. : 5,872,990
DATED : Feb. 16, 1999
INVENTOR(S) : David Arnold Luick; John Christopher Willis; Philip Braun Winterfield It is certified that error appears in the above-identified patent and that said Letters Patent is hereby corrected as shown below:

Claim 18, Col. 11, Line 36, "widow" should be --window--.

Claim 50, Col. 15, Line 25, "widow" should be --window--.

Signed and Sealed this

Twentieth Day of July, 1999

Attest:

Q. TODD DICKINSON

Attesting Officer

Acting Commissioner of Patents and Trademarks